(12) United States Patent  (10) Patent No.: US 9,313,760 B2
Kozuka et al.  (45) Date of Patent: Apr. 12, 2016

(54) COMMUNICATION SYSTEM, BASE STATION DEVICE, GATEWAY DEVICE, METHOD FOR CONTROLLING BASE STATION DEVICE, AND METHOD FOR CONTROLLING GATEWAY DEVICE, FOR ENABLING TO CONNECT USER TERMINAL TO APPROPRIATE CORE NETWORK FROM AMONG PLURALITY OF CORE NETWORKS WHEN MAKING OR RECEIVING CALL

(75) Inventors: Hideki Kozuka, Tokyo (JP); Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 150 days.

(21) Appl. No.: 14/126,697

(22) PCT Filed: Apr. 24, 2012

(86) PCT No.: PCT/JP2012/060914
§ 371 (c)(1),
(2), (4) Date: Dec. 16, 2013

(87) PCT Pub. No.: WO2012/176545
PCT Pub. Date: Dec. 27, 2012

(65) Prior Publication Data
US 2014/0120911 A1    May 1, 2014

(30) Foreign Application Priority Data
Jun. 23, 2011   (JP) .................................. 2011-139511

(51) Int. Cl.
*H04W 4/00*    (2009.01)
*H04W 60/00*   (2009.01)
(Continued)

(52) U.S. Cl.
CPC .............. *H04W 60/00* (2013.01); *H04W 24/02* (2013.01); *H04W 68/04* (2013.01); *H04W 68/12* (2013.01);
(Continued)

(58) Field of Classification Search
CPC ..... H04W 60/00; H04W 68/04; H04W 24/02; H04W 76/022; H04W 88/16; H04W 68/12; H04W 84/045; H04W 88/10
See application file for complete search history.

(56) References Cited

U.S. PATENT DOCUMENTS

2004/0162077 A1   8/2004   Kauranen et al.
2009/0061873 A1*  3/2009   Bao et al. .................... 455/436
2010/0220731 A1*  9/2010   Diab et al. ............... 370/395.53

FOREIGN PATENT DOCUMENTS

CN    1751526      3/2006
CN    102172065    8/2011
(Continued)

OTHER PUBLICATIONS
3GPP TS 25.469 V10.0.0 (Mar. 2011) Technical Specification 3rd Generation Partnership Project; Technical Specification Group Radio Access Network; UTRAN Iuh interface Home Node B (HNB) Application Part (HNBAP) signalling (Release 10), hereinafter TS25.469.*
(Continued)

*Primary Examiner* — Ronald Eisner
(74) *Attorney, Agent, or Firm* — Wilmer Cutler Pickering Hale and Dorr LLP

(57) ABSTRACT

At the time of registration of a base station, the base station reports to a gateway device list information regarding core networks that are to be connected. At the time of call origination from a user terminal, the base station reports to the gateway device, by means of a message of protocol for termination between a base station and a gateway, network identification information that indicates core networks that are to be connected to the user terminal The gateway device transfers a control message from the user terminal to the core networks indicated by the network identification information that was reported. At the time of call connection to the user terminal, the gateway device selects the base station to which paging from the core network is to be transmitted on the basis of the list information reported from the base station at the time of registration.

5 Claims, 6 Drawing Sheets

(51) Int. Cl.
*H04W 24/02* (2009.01)
*H04W 68/04* (2009.01)
*H04W 88/10* (2009.01)
*H04W 84/04* (2009.01)
*H04W 68/12* (2009.01)
*H04W 76/02* (2009.01)
*H04W 88/16* (2009.01)

(52) U.S. Cl.
CPC .......... *H04W 76/022* (2013.01); *H04W 84/045* (2013.01); *H04W 88/10* (2013.01); *H04W 88/16* (2013.01)

(56) References Cited

FOREIGN PATENT DOCUMENTS

| | | |
|---|---|---|
| EP | 2209348 A1 | 7/2010 |
| EP | 2330840 | 6/2011 |
| JP | 2006-174447 | 6/2006 |
| JP | 2006-518122 | 8/2006 |
| JP | 2006-295563 | 10/2006 |
| JP | 2008-042913 | 2/2008 |
| JP | 4109695 | 7/2008 |
| JP | 2008-535340 | 8/2008 |
| JP | 2009-239918 | 10/2009 |
| JP | 2010-136337 | 6/2010 |
| KR | 10-2011-0067113 | 6/2011 |
| WO | WO-2004/075576 | 9/2004 |
| WO | WO-2011/040596 | 4/2011 |
| WO | WO-2011/052527 A1 | 5/2011 |

OTHER PUBLICATIONS

3GPP TSG RAN WG3#65 R3-091646 Shenzhen, China, Aug. 24-28, 2009.*
International Search Report corresponding to PCT/JP2012/060914, dated Jun. 21, 2012, 5 pages.
Nokia Siemens Networks, Nokia, "Introduction of 3G HNB Support", 3GPP TSG-RAN WG3 Meeting 360, R3-081321, 2008, p. 1-17.
ZTE, "Supporting of Network Sharing of H(e)NB", 3GPP TSG WG3#65, R3-091646, 2009, p. 1-2.
"UTRAN Iuh Interface RANAP User Adaption (RUA) Signaling (Release 9)", 3GPP TS.468 V9.3.0, 2010, p. 8-18.
Samsung, "MCON Rerouting Function", 3GPP TSG RAN WG3 Meeting #61, R3-082065, 2008, p. 1-2.
Huawei, "Discussion on 3G HNB Enhancement for R11," 3GPP, TSG-RAN WG3 #72, R3-111172, Barcelona, Spain, pp. 1-4 (May 9-13, 2011).
Japanese Office Action issued by the Japanese Patent Office for Application No. 2013-521498 dated Apr. 14, 2015 (4 pages).
Extended European Search Report issued by the European Patent Office for Application No. 12802294.4 dated May 4, 2015 (10 pages).

* cited by examiner

Fig.1 (Prior Art)

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| Service Area For Broadcast | O | | SAC 9.2.13 | | YES | ignore |
| HNB Cell Access Mode | O | | 9.2.31 | | YES | reject |

M : mandatory
O : optional

Fig.3

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID List | O | 1 to < maxnoofPLMNs > | | | YES | ignore |
| > PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| Service Area For Broadcast | O | | SAC 9.2.13 | | YES | ignore |
| HNB Cell Access Mode | O | | 9.2.31 | | YES | reject |

M : mandatory
O : optional

Fig.4 (Prior Art)

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| CN Domain ID | M | | 9.2.6 | | YES | reject |
| Context ID | M | | 9.2.2 | | YES | reject |
| Intra Domain NAS Node Selector | O | | 9.2.4 | | YES | ignore |
| Establishment Cause | M | | 9.2.3 | | YES | reject |
| RANAP Message | M | | 9.2.5 | | YES | reject |
| CSG Membership Status | O | | 9.2.9 | | YES | ignore |

M : mandatory
O : optional

Fig.5

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| CN Domain ID | M | | 9.2.6 | | YES | reject |
| Context ID | M | | 9.2.2 | | YES | reject |
| Intra Domain NAS Node Selector | O | | 9.2.4 | | YES | ignore |
| Establishment Cause | M | | 9.2.3 | | YES | reject |
| RANAP Message | M | | 9.2.5 | | YES | reject |
| CSG Membership Status | O | | 9.2.9 | | YES | ignore |
| Selected PLMN identity | O | | | | YES | ignore |

M : mandatory
O : optional

COMMUNICATION SYSTEM, BASE STATION DEVICE, GATEWAY DEVICE, METHOD FOR CONTROLLING BASE STATION DEVICE, AND METHOD FOR CONTROLLING GATEWAY DEVICE, FOR ENABLING TO CONNECT USER TERMINAL TO APPROPRIATE CORE NETWORK FROM AMONG PLURALITY OF CORE NETWORKS WHEN MAKING OR RECEIVING CALL

CROSS-REFERENCE TO RELATED APPLICATIONS

This application is a national stage application of International Application No. PCT/JP2012/2012, entitled "Communication System, Base Station Device, Gateway Device, Method for Controlling Base Station Device, and Method for Controlling Gateway Device," filed on Apr. 24, 2012, which claims the benefit of the priority of Japanese patent application No. 2011-139511, filed on Jun. 23, 2011, the disclosures of each of which are hereby incorporated by reference in their entirety.

TECHNICAL FIELD

The present invention relates to communication system that connects with user terminals by femto-base stations, and in particular, relates to a communication system in which the core networks of a plurality of communication operators share femto-base stations.

BACKGROUND ART

In UMTS (Universal Mobile Telecommunications System), there is a technology known as MOCN (Multi-Operator Core Network) for the sharing of wireless access networks by the core networks (CNs) of a plurality of communication operators (see Patent Documents 1 and 2).

In MOCN, when a femto-base station (HNB: Home NodeB) is shared by a plurality of communication operators, the HNB is connected with a plurality of CNs by way of an HNB-GW (HNB-Gateway). When a call is originated from a user terminal, the HNB-GW must transfer a control message from the user terminal to the appropriate CN.

At the time of starting up an HNB, the HNB must be connected to a plurality of CNs by way of an HNB-GW as described above. For this purpose, the plurality of CNs that are to connect with the HNB must be reported to the HNB-GW at the start-up time of the HNB.

LITERATURE OF THE PRIOR ART

Patent Documents

Patent Document 1: Japanese Unexamined Patent Application Publication No. 2008-535340
Patent Document 2: Japanese Patent No. 4109695

SUMMARY OF THE INVENTION

Problem to be Solved by the Invention

In MOCN, a control message is transferred by a RANAP (Radio Access Network Application Part) at the time of call origination from a user terminal that is connected to an HNB. A Selected PLMN (PublicLand MobileNetwork) Identity is contained in a RANAP Initial UE Message prescribed by 3GPP 25.423, and the CN selected by the user terminal can be designated by this Selected PLMN Identity in the RANAP Initial UE Message.

As a result, the HNB-GW must decode this RANAP Initial UE Message to learn the CN to which the control message is to be transferred. However, if the RANAP version has been updated and the parameter of "criticality=reject" has been added, the possibility arises that the decoder will not correspond to the new version, whereby an Error Indication will be generated and HNB-GW will be unable to transfer the control message to the proper CN.

Taking the role of an HNB-GW into consideration, a functional configuration of a system is preferable in which an HNB-GW need not decode a RANAP message. This is clear from the following sentence noted in 3GPP 25.468: "Additional information is provided to enable the HNB-GW to handle the RANAP message without it being necessary to inspect the contents and trigger the establishment of a new UE-associated Signaling Connection between HNB and HNB-GW, which is directly mapped to the Iu Signaling Connection the RANAP message refers to."

In addition, in current protocol, only one PLMN ID can be set in an HNB Registration Request that is transmitted from the HNB to the HNB-GW at the time of HNB activation. FIG. 1 is a table showing the parameters that are described in a typical HNB Registration Request message. FIG. 1 shows the parameters of an HNB Registration Request message as stipulated in 3GPP 25.469 V9.3.0. As can be seen from an inspection of this table, only one PLMN ID can be set in the HNB Registration Request.

Consequently, the PLMN IDs of a plurality of CNs to which an HNB is to be connected cannot be reported to the HNB-GW, and the HNB-GW is unable to properly connect the HNB with a plurality of CNs. As a result, at the time of connecting a call to a user terminal that is connected to the HNB of MOCN, the HNB-GW is unable to transfer Paging to the proper HNB of the intended transfer, and the possibility arises that normal call connection will not be possible.

It is therefore an object of the present invention to provide a technology for sharing of a femto-base station by the core networks of a plurality of communication operators and for enabling normal call origination and connection of user terminals.

Means for Solving the Problem

The communication system of the present invention for achieving the above-described object includes a base station device that connects with a user terminal by a wireless line and a gateway device that connects the base station device with a plurality of core networks; wherein:

at the time of registration of the base station device, the base station device reports to the gateway device list information of the core networks to which connection is to be implemented;

at the time of call origination from the user terminal, the base station device reports to the gateway device, by means of a message of protocol for termination between a base station device and gateway device, network identification information that indicates core networks that are to be connected with the user terminal; and the gateway device transfers a control message from the user terminal to core networks that are indicated by the network identification information that was reported; and at the time of call connection to the user terminal, the gateway device, based on the list information that was reported from the base station device at the time of the registration, selects the base station devices to which paging from the core networks is to be transmitted.

The base station device of the present invention is a base station device that connects to a user terminal by a wireless line and that connects to a plurality of core networks by way of a gateway device; the base station device including:

a registration unit that carries out a process of registration of the base station device in core networks, and in this process, reports to the gateway device list information of core networks to which connection is to be implemented; and a call control unit that carries out a process of call origination from the user terminal, and in this process, that reports to the gateway device, by means of a message of protocol for termination between a base station device and gateway device, network identification information that indicates core networks that are to be connected to the user terminal The gateway device of the present invention is a gateway device that connects a base station device that connects to a user terminal by a wireless line to a plurality of core networks, the gateway device including:

a registration unit that carries out a process of registration of the base station device in core networks and that receives from the base station device list information of the core networks to which the base station device is to be connected;

a data management unit that holds the list information that was received by the registration unit; and a call control unit that carries out processes of call origination from the user terminal and call connection to the user terminal, and in the call origination process, receives from the base station device, by means of a message of protocol for termination between a base station device and a gateway, network identification information that indicates core networks that are to be connected with the user terminal and transfers a control message from the user terminal to core networks indicated by the network identification information that was received; and in the call connection process, selects the base station device to which paging from core networks is to be transmitted based on the list information that is held by the data management unit.

The base station device control method of the present invention is a base station device control method for controlling a base station device that connects to a user terminal by a wireless line and connects to a plurality of core networks by way of a gateway device, the base station device control method including steps of:

in a process of registration of the base station device to core networks, reporting to the gateway device list information of core networks that are to be connected; and in a process of call origination from the user terminal, reporting to the gateway device, by means of a message of protocol for termination between a base station device and gateway device, network identification information that indicates core networks that are to be connected with the user terminal.

The gateway device control method of the present invention is a gateway device control method for controlling a gateway device that connects a base station device that connects with a user terminal by a wireless line to a plurality of core networks, the gateway device control method including steps of:

in a process of registration of the base station device in core networks, receiving from the base station device list information of core networks to which the base station device is to be connected and holding this list information;

in a process of call origination from the user terminal, receiving from the base station device, by means of a message of protocol for termination between a base station device and gateway, network identification information that indicates core networks that are to be connected with the user terminal;

transferring a control message from the user terminal to core networks that are indicated by the network identification information that was received; and in a process of call connection to the user terminal, selecting a base station device to which paging from the core networks is to be transmitted based on the list information that is held.

Effect of the Invention

According to the present invention, normal call origination and connection of a user terminal is possible in a communication system in which a base station device is shared by the core networks of a plurality of communication operators.

BRIEF DESCRIPTION OF THE DRAWINGS

FIG. 1 is a table showing the parameters that are described in a typical HNB Registration Request message.

FIG. 3 is a table showing the parameters that are described in an HNB Registration Request message according to the present exemplary embodiment.

FIG. 4 is a table showing the parameters described in a typical RUA Connect message.

FIG. 5 is a table showing the parameters described in a RUA Connect message of the present exemplary embodiment.

BEST MODE FOR CARRYING OUT THE INVENTION

An exemplary embodiment of the present invention is next described with reference to the accompanying drawings.

Figure 2:
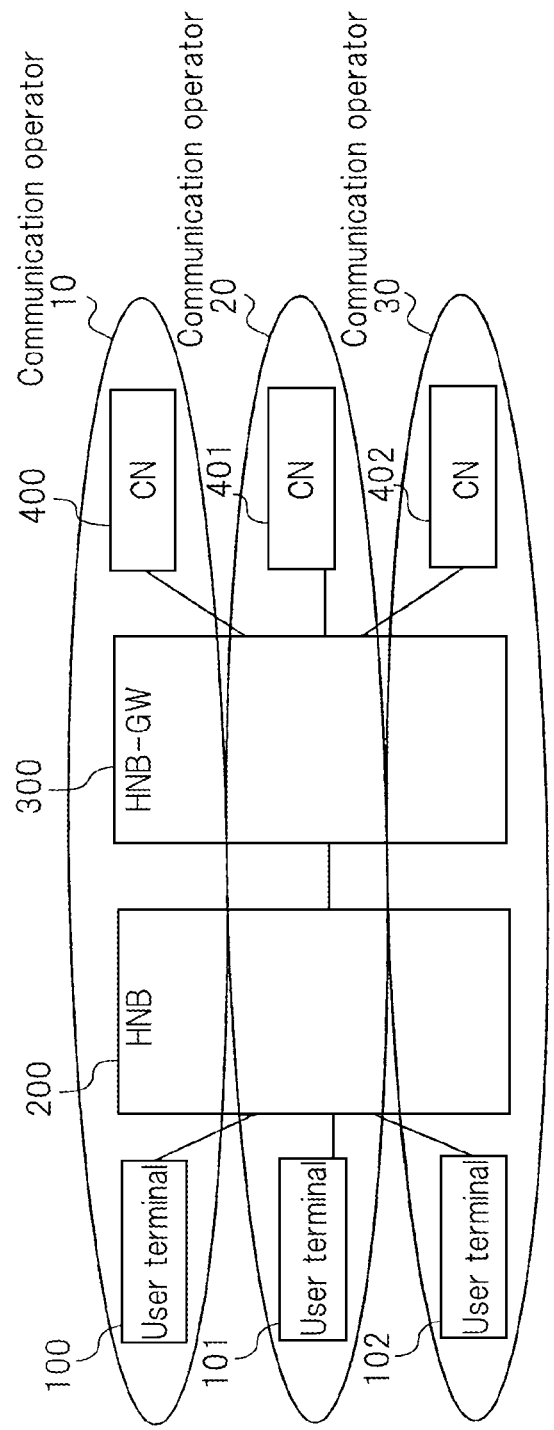
FIG. 2 is a block diagram showing the configuration of the communication system of the present exemplary embodiment.

FIG. 2 is a block diagram showing the configuration of the communication system of the present exemplary embodiment. The communication system of the present exemplary embodiment is a UMTS system that allows MOCN by femto-base stations.

Referring to FIG. 2, HNB 200 is connected to a plurality of CNs 400-402 by way of HNB-GW 300. HNB 200 connects with a plurality of user terminals 100-102 by wireless lines. User terminals 100-102 are wireless communication terminals such as portable telephones or smartphones. CNs 400-402 are networks operated by mutually differing communication operators 10-30, connect calls of subscribing user terminals, and relay communication. User terminals 100-102 subscribe to the services of communication operators 10-30, respectively, and the terminals of each connect to respective CNs 400-402 of communication operators 10-30 to which they subscribe.

HNB 200 is a base station device of a femtocell that connects with user terminals 100-102 by wireless lines and is shared by communication operators 10, 20, and 30. At the time of registration such as when starting up, HNB 200 reports to HNB-GW 300 list information of CNs to which its own device is to connect. This list information can contain the network identification information of a plurality of CNs. In the example of the present exemplary embodiment, the list information contains network identification information of CNs 400-402, whereby user terminals 100-102 are able to connect with CNs 400-402 to which their own devices subscribe by way of HNB 200.

More specifically, the stipulations of an HNBAP HNB Registration Request message as defined by 25.469 V9.3.0 of 3GPP have been modified in the present exemplary embodiment, and HNB 200 is able to load a list of a plurality of PLMN IDs, which is list information, as a parameter in the HNBAP HNB Registration Request message and report this message to HNB-GW 300.

FIG. 3 is a table showing the parameters that are described in an HNB Registration Request message according to the present exemplary embodiment. Comparing the table of FIG. 3 according to the present exemplary embodiment with the table of FIG. 1, the parameter referred to as PLMN-ID List has been added in FIG. 3. This parameter can describe a list of PLMN IDs of a number that, at a maximum, is the maximum number of PLMNs.

In addition, at the time of call origination from any user terminal, HNB 200 reports to HNB-GW 300 by means of a message of protocol for termination between HNB and HNB-GW, network identification information that indicates the CNs to which the user terminal is to be connected. In the present exemplary embodiment, for example, user terminal 100 subscribes to CN 400, and HNB 200 therefore, at the time of call origination from user terminal 100, reports to HNB-GW 300 network identification information of CN 400 to which user terminal 100 is to be connected.

More specifically, the stipulations of a RUA Connect message as defined in 25.468 V9.3.0 of 3GPP have been modified in the present exemplary embodiment, and HNB 200 is able to load PLMN IDs, which are network identification information of CNs, as a parameter in a RUA Connect message and then notify HNB-GW 300. RUA (RANAP User Adaption) is a protocol for termination between HNB and HNB-GW.

FIG. 4 is a table showing the parameters that are described in a typical RUA Connect message. FIG. 5 is a table showing the parameters that are described in a RUA Connect message of the present exemplary embodiment.

FIG. 4 shows the parameters of a RUA Connect message as stipulated in 25.468 V9.3.0 of 3GPP. As can be understood by looking at this table, the PLMN IDs indicating CNs to which a user terminal is to be connected cannot be set in a RUA Connect message.

In contrast, in FIG. 5, the Selected PLMN Identity is added as a parameter that can be set in a RUA Connect message. HNB 200 is able to set the PLMN IDs of CNs to which user terminal 100 is to be connected in this Selected PLMN Identity and notify HNB-GW 300.

HNB-GW 300 is a gateway device that connects HNB 200 to a plurality of CNs 400-402 and is shared by a plurality of communication operators 10, 20, and 30.

At the time of registration of HNB 200, HNB-GW 300 receives from HNB 200 list information of the CNs to which HNB 200 is to be connected. HNB-GW 300, having received the list information, includes the paging areas in each CN to which HNB 200 is to belong in list information and holds this list information.

At the time of call origination from a user terminal, HNB-GW 300 transfers a control message from the user terminal to the CNs that are indicated by the network identification information that was reported from HNB 200. For example, if the network identification information that was reported from HNB 200 at the time of call origination from user terminal 100 indicates CN 400, HNB-GW 300 transfers the control message from user terminal 100 to CN 400, whereby the control message from user terminal 100 can be transferred to CN 400 to which user terminal 100 subscribes.

In addition, at the time of call connection to any user terminal, HNB-GW 300 selects the HNB to which paging is to be transmitted from a CN based on the list information that is held. It is here assumed that user terminal 100 is in the service area of HNB 200 and that call connection has occurred from CN 400 to user terminal 100. In this case, HNB-GW 300 transmits the paging from CN 400 to the base station device that belongs to the paging area that contains HNB 200.

FIG. 2 shows only one HNB 200, but in actuality, a plurality of base station devices exists in the communication system. HNB-GW 300, having received the call connection message from CN 400 to user terminal 100, transmits the paging only to the base station device that belongs to that paging area.

Figure 6:
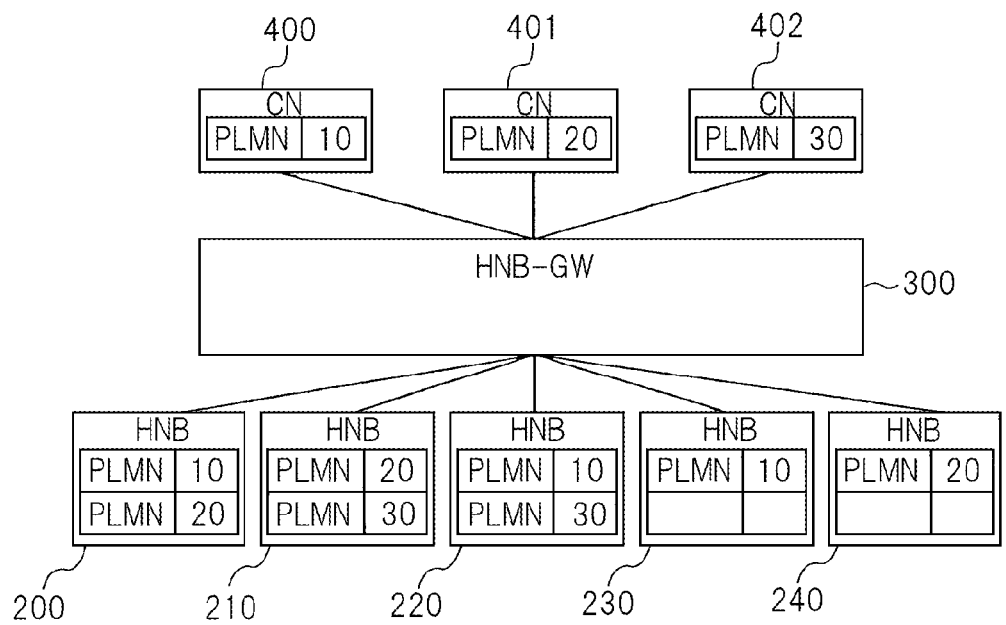
FIG. 6 shows an example of the connection configuration when there is a plurality of HNB in the same paging area.

FIG. 6 shows an example of the connection configuration when there is a plurality of HNBs in the same paging area. A plurality of HNBs 200, 210, 220, 230, and 240 are shown in FIG. 6. The PLMN IDs of the CNs to which each of HNBs 200-240 shown in the figure is connected are shown. For example, HNB 200 is connected to CN 400 for which PLMN ID=10 and CN 401 for which PLMN ID=20. In addition, HNB 210 is connected to CN 401 for which PLMN ID=20 and CN 402 for which PLMN ID=30. HNB 220 is connected to CN 400 for which PLMN ID=10 and CN 402 for which PLMN ID=30. HNB 230 is connected to CN 400 for which PLMN ID=10. HNB 240 is connected to CN 401 for which PLMN ID=20. In the interest of simplifying the explanation, it is assumed that, of the HNB that appear, there are none that belong to different paging areas.

In the connection configuration of FIG. 6, when, for example, there is call connection to user terminal 100 from CN 400, HNB-GW 300 transmits paging to HNBs 200, 220, and 230 that are connected to CN 400 (PLMN ID=10). In addition, when, for example, there is call connection to user terminal 101 from CN 401, HNB-GW 300 transmits paging to HNBs 200, 210, and 240 that are connected to CN 401 (PLMN ID=20).

According to the present exemplary embodiment as described hereinabove, at the time of registration of HNB 200, list information of CNs that are to be connected is reported to HNB-GW 300, and at the time of call connection to a user terminal, HNB-GW 300 selects HNB 200 to which paging is to be transmitted based on the list information. In addition, at the time of call origination from a user terminal, HNB 200 reports to HNB-GW 300 network identification information of the CNs to which the user terminal is to be connected, and HNB-GW 300 transfers a control message from the user terminal to the core networks that are indicated by the network identification information. As a result, proper call origination and connection of a user terminal becomes possible in a system configuration in which HNB is shared by a plurality of CNs.

Figure 7:
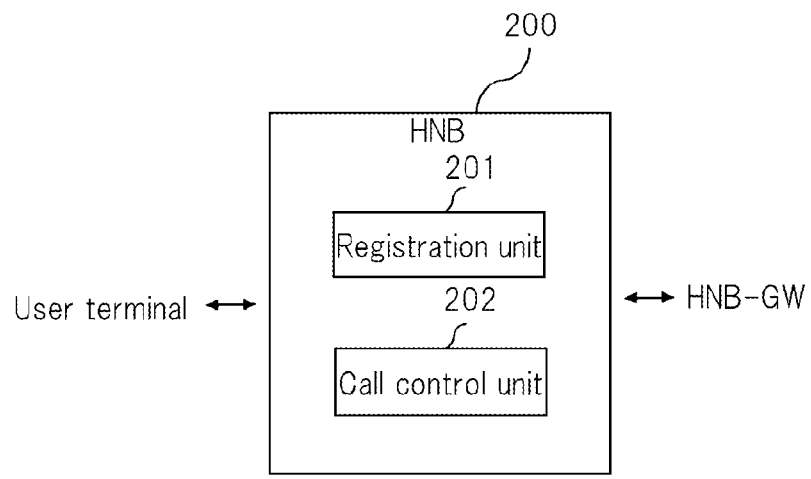
FIG. 7 is a block diagram showing the configuration of HNB 200.

FIG. 7 is a block diagram showing the configuration of HNB 200. Referring to FIG. 7, HNB 200 includes registration unit 201 and call control unit 202.

As described hereinabove, HNB 200 is a base station device that connects with user terminals 100-102 by wireless lines and that connects with a plurality of CNs 400-402 by way of HNB-GW 300.

Registration unit 201 carries out a process of registration of HNB 200 to CNs, and in this process, reports to HNB-GW 300 list information of the CNs that are to be connected.

Figure 8:
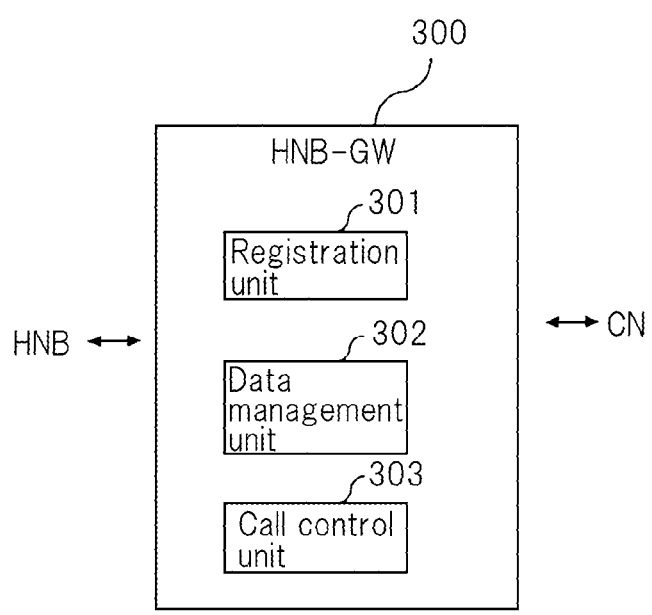
FIG. 8 is a block diagram showing the configuration of HNB-GW 300.

Call control unit 202 carries out processes of call origination and call connection of a user terminal, and in the call origination process, reports to HNB-GW 300, by means of a message of protocol for termination between HNB 200 and HNB-GW 300, network identification information that indicates CNs that are to be connected with the user terminal FIG. 8 is a block diagram showing the configuration of HNB-GW 300. Referring to FIG. 8, HNB-GW 300 includes registration unit 301, data management unit 302, and call control unit 303.

As described hereinabove, HNB-GW 300 is a gateway device that connects HNB 200, which connects with user terminals 100-102 by wireless lines, to a plurality of CNs 400-402.

Registration unit 301 carries out a process of registration of HNB 200 in CNs 400-402, and at this time, receives from HNB 200 list information of CNs 400-402 to which HNB 200 is to be connected.

Data management unit 302 holds the list information that was received by registration unit 301. More specifically, data management unit 302 holds and manages information of the correspondence relation between CNs and PLMN IDs, information of the correspondence relation between HNBs and CNs that are connected to these HNBs, and information of the user terminals that are in the service areas of HNBs. The list information that was received by registration unit 301 is held as information of the correspondence relation between HNBs and the CNs that are connected to the HNBs.

Call control unit 303 carries out a process of call origination from user terminals 100-102 and a process of call connection to user terminals 100-102. At these times, call control unit 303 receives from HNB 200 network identification information that indicates the CNs that are to be connected with a user terminal by means of a message of protocol for termination between an HNB and HNB-GW in the call origination process, and transfers the control message from a user terminal to the CNs that are indicated by the network identification information. In addition, in a call connection process, call control unit 303 selects HNB 200 to which paging from a CN is to be transmitted based on the list information that is held by data management unit 302.

The procedure at the time of call origination of the present exemplary embodiment is next described. Call origination from user terminal 100 is here described as an example.

Step 1-1: HNB 200 reports over wireless lines, to user terminals 100-102 by SIB18 (System Information Block 18) that conforms with TS 25.331 of 3GPP, a list of the PLMN IDs of a plurality of communication operators that are connected.

Step 1-2: User terminal 100 selects the PLMN ID of communication operator 10 to which its own device subscribes from within the list of PLMN IDs that was reported and establishes an RRC connection with HNB 200.

Step 1-3: HNB 200 sets the PLMN ID of communication operator 10 that is contained in the RRC message that was received from user terminal 100 in a RUA Connect message and transmits to HNB-GW 300.

Step 1-4: Call control unit 303 of HNB-GW 300 that has received the RUA Connect message acquires the PLMN ID that is contained in the RUA Connect and acquires from data management unit 302 the information for CN 400 that corresponds to the PLMN ID.

Step 1-5: Call control unit 303 of HNB-GW 300 transfers a RANAP Initial UE Message to this CN 400.

HNB-GW 300 thus is able to route the RANAP Initial UE Message to CN 400, which is the appropriate transmission destination, without decoding the RANAP message.

The procedure at the time of HNB registration of the present exemplary embodiment is next described.

Step 2-1: When HNB 200 is started up, HNB 200 transmits an HNBAP HNB Register Request message to HNB-GW 300. At this time, HNB 200 sets in the message a list of the PLMN IDs of communication operators 10, 20, and 30 with which HNB 200 is to be connected.

Step 2-2: Registration unit 301 of HNB-GW 300 that has received the HNBAP HNB Register Request message passes information indicating HNB 200 and the list of PLMN IDs that was reported to data management unit 302.

Step 2-3: Data management unit 302 of HNB-GW 300 saves the information that was passed from registration unit 301.

The procedure at the time of receiving paging in the present exemplary embodiment is next described. The communication system is here assumed to have the connection configuration of FIG. 6.

Step 3-1: HNB-GW 300 receives a RANAP Paging message from CN 400.

Step 3-2: Call control unit 303 of HNB-GW 300 that has received the RANAP Paging message passes the information contained in the RANAP Paging message to data management unit 302. In the information that is saved in data management unit 302, CN 400 (PLMN ID=10) is connected to HNBs 200, 220, and 230, and information that indicates HNB 200, HNB 220, and HNB 230, that are the transmission destinations of the RANAP Paging message, is therefore returned from data management unit 302 to call control unit 303.

Step 3-3: HNB-GW 300 transmits a RUA Connectionless Transfer that carries the RANAP Paging message to HNB 200, HNB 220, and HNB 230.

The procedure of searching for the HNB that is the transmission destination of a RANAP Paging message in the above-described Step 3-2 is next described.

Step 4-1: HNB-GW 300 judges whether location information exists in data management unit 302 regarding the location of user terminal 100, and if the information exists, extracts the information of the HNB of the location of user terminal 100. At this time, the existence or absence of the location information of user terminal 100 can be judged by whether or not the International Mobile Subscriber Intensity (IMSI) contained in the RANAP Paging message has been registered.

Step 4-2: When the location information of user terminal 100 does not exist in data management unit 302, HNB-GW 300 extracts the Paging Area ID that has been set in the RANAP Paging message. HNB-GW 300 then extracts the HNB for which the PLMN ID, that is contained in the Paging Area ID, matches with the affiliated Paging area information (Location Area Code or Routing Area Code).

Although the present invention has been described hereinabove with reference to an exemplary embodiment, the present invention is not limited to the above-described exemplary embodiment. The configuration and details of the present invention are open to various modifications within the scope of the present invention that will be clear to one of ordinary skill in the art.

This application claims the benefits of priority based on Japanese Patent Application No. 2011-139511 for which application was submitted on Jun. 23, 2011 and incorporates by citation all of the disclosures of that application.

What is claimed is:
1. A communication system having a base station device that connects with a user terminal by a wireless line and a gateway device that connects said base station device with a plurality of core networks; wherein:

at a time of registration in which said base station device requests to register itself in said plurality of core networks, said base station device reports to said gateway device, list information of core networks to which connection is to be implemented;

at a time of call origination from said user terminal, said base station device reports to said gateway device, by means of a message of an end-to-end protocol used for communication between a base station device and gateway device, network identification information that indicates core networks that are to be connected with said user terminal;

said gateway device transfers a control message from said user terminal to core networks that are indicated by said network identification information that was reported; and at a time of call connection to said user terminal, said gateway device, based on said list information that was reported from said base station device at the time of said registration, selects base station devices to which paging from said core networks is to be transmitted.

2. The communication system as set forth in claim 1, wherein said base station device, at the time of said registration, loads a list of PLMN (Public Land Mobile Network) IDs, which are said list information, as a parameter into an HNBAP (Home NodeB Application Part) HNB (Home NodeB) Registration Request message and reports to said gateway device.

3. The communication system as set forth in claim 1, wherein said base station device, at the time of call origination from said user terminal, loads PLMN IDs, which are said network identification information, as a parameter in a RUA (RANAP (Radio Access Network Application Part) User Adaption) Connect message and reports to said gateway device.

4. A gateway device that connects a base station device that connects to a user terminal by a wireless line to a plurality of core networks, comprising:

a registration unit that carries out a process of registration of said base station device in core networks and that receives from said base station device, list information of core networks, to which said base station device is to be connected;

a data management unit that holds said list information that was received by said registration unit; and a call control unit that carries out processes of call origination from said user terminal and call connection to said user terminal, and in said call origination process, receives from said base station device, by means of a message of an end-to-end protocol used for communication between a base station device and a gateway, network identification information that indicates core networks that are to be connected with said user terminal, and transfers a control message from said user terminal to core networks indicated by said network identification information that was received, and in said call connection process, selects a base station device to which paging from said core networks is to be transmitted based on said list information that is held by said data management unit.

5. A gateway device control method for controlling a gateway device that connects a base station device that connects with a user terminal by a wireless line to a plurality of core networks, comprising steps of:

in a process of registration of said base station device in core networks, receiving from said base station device, list information of core networks to which said base station device is to be connected;

in a process of holding said list information;

in a process of call origination from said user terminal, receiving from said base station device, by means of a message of an end-to-end protocol used for communication between a base station device and gateway, network identification information that indicates core networks that are to be connected to said user terminal;

transferring a control message from said user terminal to core networks that are indicated by said network identification information that was received; and in a process of call connection to said user terminal, selecting a base station device to which paging from said core networks is to be transmitted based on said list information that is held.

* * * * *